(12) United States Patent
Hirata

(10) Patent No.: US 10,797,624 B2
(45) Date of Patent: Oct. 6, 2020

(54) ROTATION ANGLE CORRECTION DEVICE AND MOTOR CONTROL SYSTEM

(71) Applicant: RENESAS ELECTRONICS CORPORATION, Tokyo (JP)

(72) Inventor: Atsuhiro Hirata, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/385,733

(22) Filed: Apr. 16, 2019

(65) Prior Publication Data

US 2019/0348933 A1 Nov. 14, 2019

(30) Foreign Application Priority Data

May 9, 2018 (JP) .................... 2018-090801

(51) Int. Cl.
*B23Q 35/00* (2006.01)
*H02P 6/16* (2016.01)

(52) U.S. Cl.
CPC ............ *H02P 6/16* (2013.01); *H02P 2203/05* (2013.01)

(58) Field of Classification Search
CPC ........... H02P 6/16; H02P 2203/05; H02P 6/15
See application file for complete search history.

(56) References Cited

U.S. PATENT DOCUMENTS

2014/0300306 A1* 10/2014 Kato .................. G01D 5/208
318/490

FOREIGN PATENT DOCUMENTS

JP 6184609 B2 8/2017

* cited by examiner

*Primary Examiner* — Karen Masih
(74) *Attorney, Agent, or Firm* — McDermott Will & Emery LLP

(57) ABSTRACT

A rotation angle correction device corrects a rotation angle of a converter converting a signal from a resolver attached to a motor. An arrival time measurement unit measures an arrival time at which the rotation angle reaches a specified rotation angle from a reference angle in a current cycle. A reference time calculation unit calculates a reference time at which the rotation angle reaches the specified rotation angle from the reference angle assuming that the motor rotates in the current cycle at the same angular velocity as an angular velocity in a previous cycle. A difference calculation unit calculates a difference between the arrival time and the reference time. An error angle calculation unit multiplies the difference between the arrival time and the reference time and the angular velocity in the previous cycle to obtain an error angle. A correction unit corrects the rotation angle based on the error angle.

18 Claims, 16 Drawing Sheets

ROTATION ANGLE CORRECTION DEVICE AND MOTOR CONTROL SYSTEM

CROSS-REFERENCE TO RELATED APPLICATIONS

The disclosure of Japanese Patent Application No. 2018-090801 filed on May 9, 2018 including the specification, drawings and abstract is incorporated herein by reference in its entirety.

BACKGROUND

The present invention relates to a rotation angle correction device and a motor control system, and relates to a technique of correcting an output rotation angle of a resolver digital converter, for example.

There is conventionally known a device that corrects an output rotation angle of a resolver digital converter. For example, in a device described in Japanese Patent No. 6184609, a position detector performs frequency analysis of a specific frequency component of motor current, and a cyclic error of the position detector is estimated on the basis of the result of frequency analysis. An angular error estimation unit then estimates an error amount from the result of frequency analysis by the frequency analysis unit, and performs correction.

SUMMARY

However, the rotation angle correction device described in Japanese Patent No. 6184609 requires processing such as frequency analysis, and therefore a calculation amount for correcting a rotation angle increases. Consequently, if calculation for correcting a rotation angle is performed by hardware, the circuit scale is increased. If that calculation is performed by software, a high-speed CPU and a large-capacity memory are required.

Other objects and novel features will be apparent from the description of this specification and the accompanying drawings.

A rotation angle correction device according to an embodiment calculates an error angle by multiplying a difference between an arrival time, which is a time until an output rotation angle reaches a specified rotation angle from a reference angle in a current cycle, and a reference time, which is a time until the output rotation angle reaches the specified rotation angle from the reference angle when it is assumed that a motor rotates in the current cycle at the same angular velocity as an angular velocity in a previous cycle, and the angular velocity in the previous cycle, and corrects the output rotation angle on the basis of the error angle.

According to the rotation angle correction device of the embodiment, it is possible to correct a rotation angle in a small calculation amount.

DETAILED DESCRIPTION

Figure 1:
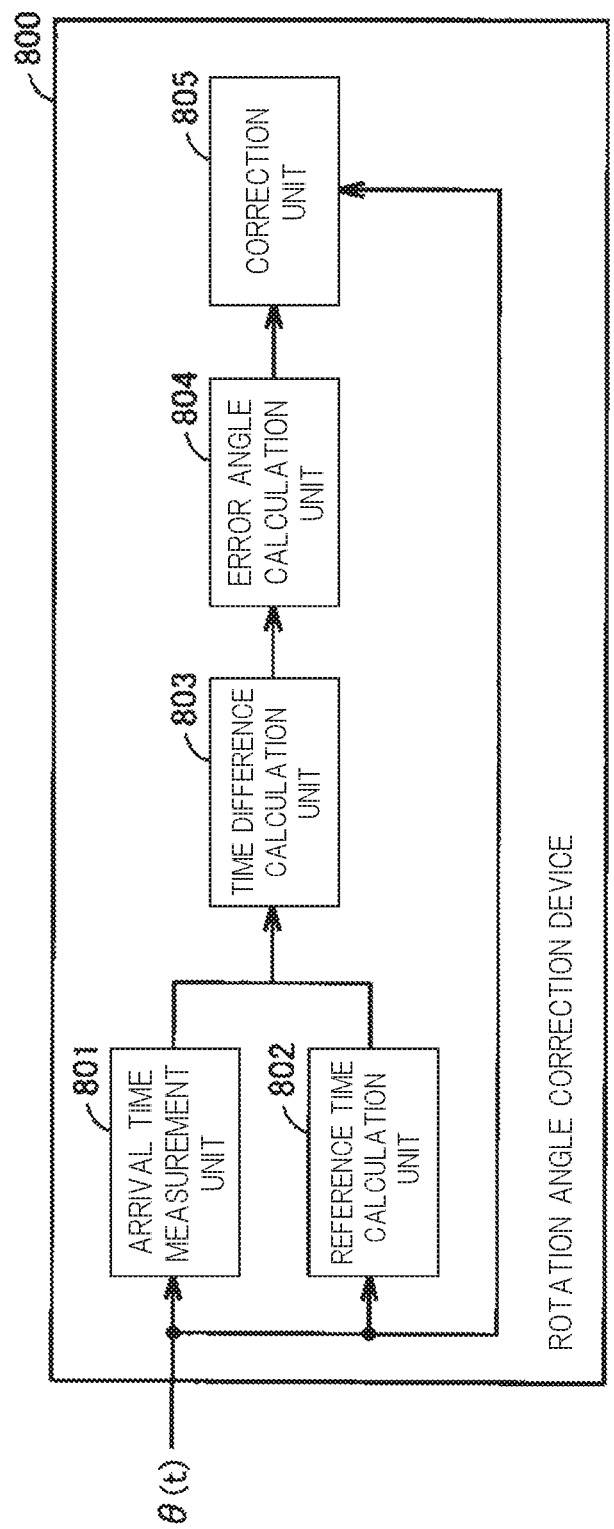
FIG. 1 illustrates a configuration of a rotation angle correction device according to a first embodiment.

Embodiments are described below referring to the drawings.

First Embodiment

FIG. 1 illustrates a configuration of a rotation angle correction device according to a first embodiment.

Referring to FIG. 1, the rotation angle correction device corrects an output rotation angle θ(t) of a resolver digital converter that converts a signal output from a resolver attached to a motor.

An arrival time measurement unit 801 measures an arrival time that is a time until the output rotation angle θ(t) reaches a specified rotation angle from a reference angle in a current cycle.

A reference time calculation unit 802 calculates a reference time that is a time until the output rotation angle θ(t) reaches the specified rotation angle from the reference angle, assuming that the motor rotates in the current cycle at the same angular velocity as that in a previous cycle.

A time difference calculation unit 803 calculates a time difference between the arrival time and the reference time.

An error angle calculation unit 804 calculates an error angle by multiplying the time difference between the arrival time and the reference time, and the angular velocity in the previous cycle.

A correction unit 805 corrects the output rotation angle θ(t) on the basis of the error angle.

As described above, processing such as frequency analysis is not required according to the present embodiment. Therefore, it is possible to correct an output rotation angle θ(t) in a small calculation amount.

Second Embodiment

Figure 2:
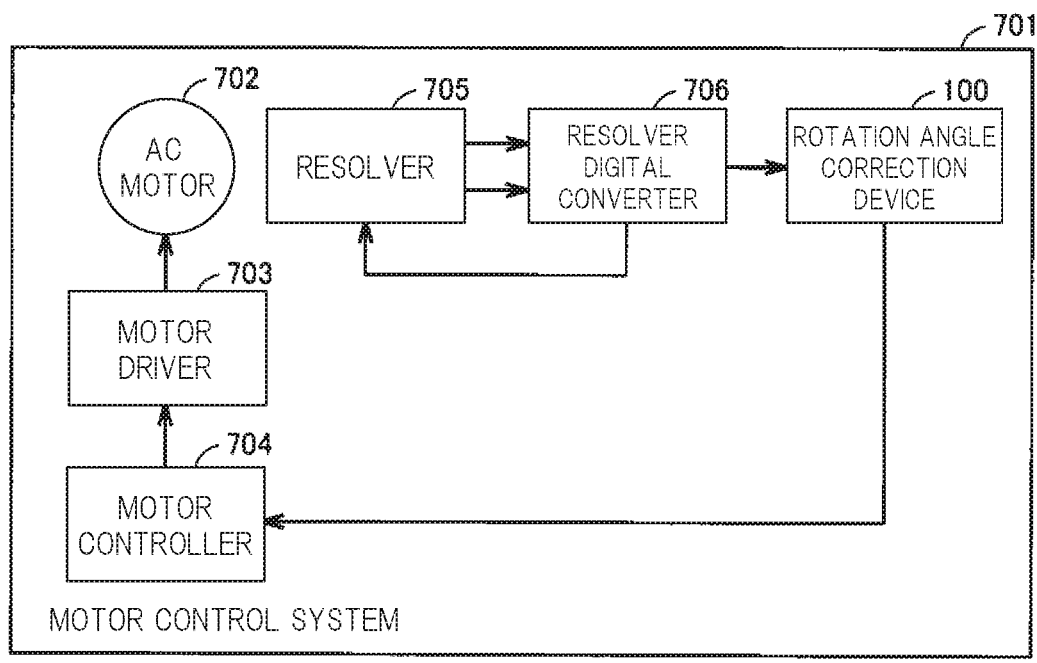
FIG. 2 illustrates a configuration of a motor control system according to a second embodiment.

FIG. 2 illustrates a configuration of a motor control system according to a second embodiment.

A motor control system 701 includes an AC motor 702, a motor driver 703, a motor controller 704, a resolver 705, a resolver digital converter 706, and the rotation angle correction device 100.

The motor driver 703 drives the AC motor 702. The motor driver 703 converts DC power from a DC power supply to AC current by an inverter to drive the AC motor 702.

The motor controller 704 is configured by a microcomputer. The motor controller 704 controls current to be supplied from the motor driver 703 to the AC motor 702. In power-supply control for the AC motor 702, the motor controller 704 controls current to be supplied to the AC motor 702 in accordance with a rotor rotation angle $\theta(t)$ that has been detected by the resolver digital converter 706 and has been corrected by the rotation angle correction device 100.

The resolver 705 outputs an analog sine-wave signal that represents a sine of a rotation angle of the AC motor 702 and an analog cosine-wave signal that represents a cosine of the rotation angle of the AC motor 702.

The resolver digital converter 706 converts the sine-wave signal and the cosine-wave signal output from the resolver 705 to digital values, and outputs the rotation angle of the AC motor 702 on the basis of the sine-wave signal and the cosine-wave signal after digital conversion.

Figure 3:
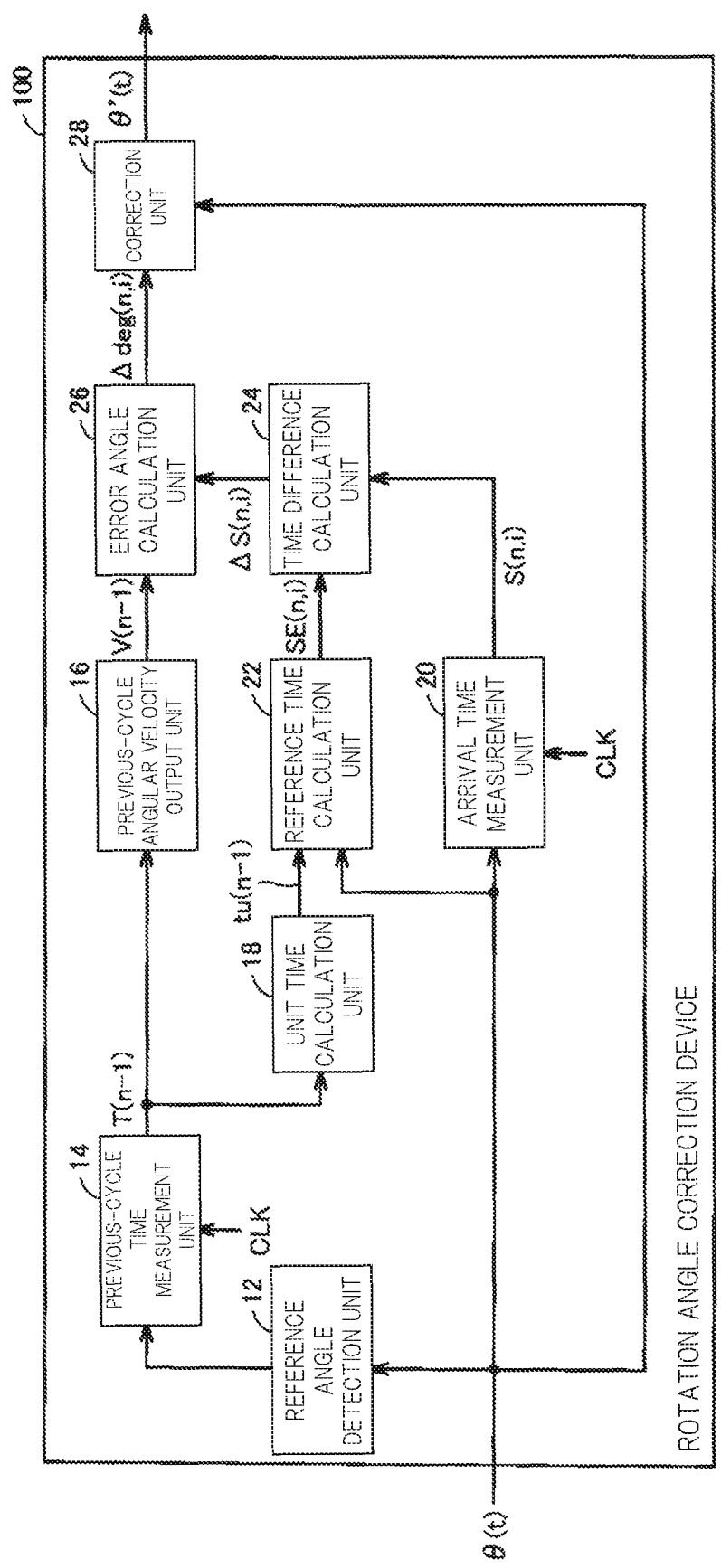
FIG. 3 illustrates a configuration of a rotation angle correction device 100 according to the second embodiment.
Figure 4:
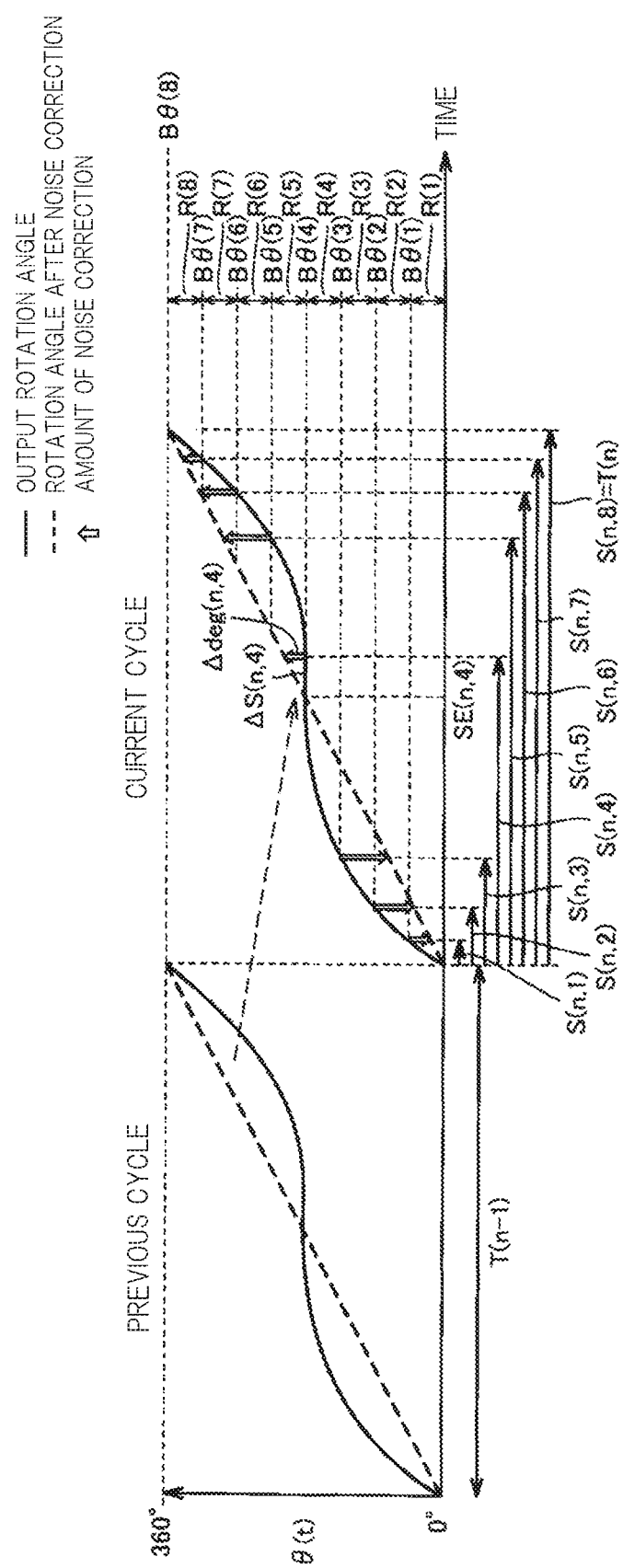
FIG. 4 explains an arrival time S(n, i), a reference time SE(n, i), a time difference ΔS(n, i), and an error angle Δdeg(n, i).

FIG. 3 illustrates a configuration of the rotation angle correction device 100 according to the second embodiment. FIG. 4 explains an arrival time $S(n, i)$, a reference time $SE(n, i)$, a time difference $\Delta S(n, i)$, and an error angle $\Delta deg(n, i)$.

The following description is provided, assuming that an output rotation angle $\theta$ from the resolver digital converter 706 is 00 or more and is less than 360° and is represented by 12 bits (0 to 4095). The output rotation angle $\theta$ in hexadecimal is $(XXX)_{16}$. 1 bit of the output rotation angle $\theta$ represents a unit angle $\theta u$ represented by the following expression.

$$\theta u = 360°/4096 \approx 0.0878° \qquad (1)$$

The maximum value of the output rotation angle $\theta$ is represented by the following value X.

$$X = (4095)_{10} = (FFF)_{16} \qquad (2)$$

As illustrated in FIG. 4, a range from the minimum value to the maximum value of the output rotation angle $\theta$ is divided into $2^m$ sections from a section $R(1)$ to a section $R(2^m)$.

A range of the output rotation angle $\theta$ in the section $R(1)$ is represented by the following expression.

$$0 \leq \theta < B\theta(1) \qquad (3)$$

A range of the output rotation angle $\theta$ in the section $R(k)$ is represented by the following expression, where k=2 to $2^m$.

$$B\theta(k-1) \leq \theta < B\theta(t) \qquad (4)$$

For i=1 to m, a specified rotation angle $B\theta(i)$ is represented by the following expression.

$$B\theta(i) = (360/2^m) \times i \qquad (5)$$

The following description is provided for m=3.

The rotation angle correction device 100 includes a reference angle detection unit 12, a previous-cycle time measurement unit 14, a previous angular velocity output unit 16, a unit time calculation unit 18, an arrival time measurement unit 20, a reference time calculation unit 22, a time difference calculation unit 24, an error angle calculation unit 26, and a correction unit 28.

The reference angle detection unit 12 notifies the previous-cycle time measurement unit 14 when the output rotation angle $\theta(t)$ input to the reference angle detection unit 12 has reached 0° that is a reference angle. Here, a sampling interval of the output rotation angle $\theta(t)$ is a period $\Delta Tck$ of a clock CLK.

The previous-cycle time measurement unit 14 obtains a previous-cycle time $T(n-1)$ on the basis of a difference between a first timing and a second timing. The first timing is a timing at which the previous-cycle time measurement unit 14 has received a previous notification from the reference angle detection unit 12 (that is, a timing at which the output rotation angle $\theta(t)$ has reached the reference angle (0°) in a previous cycle). The second timing is a timing at which the previous-cycle time measurement unit 14 has received a current notification from the reference angle detection unit 12 (that is, a timing at which the output rotation angle $\theta(t)$ has reached the reference angle (0°)). Specifically, the previous-cycle time measurement unit 14 counts a time from the first timing to the 22nd timing, and outputs a count result as the previous-cycle time $T(n-1)$. The previous-cycle time measurement unit 14 increments the count value by one for each period $\Delta Tck$ of the clock CLK.

The previous angular velocity output unit 16 divides 360° by the previous-cycle time $T(n-1)$ to obtain an angular velocity $V(n-1)$ in the previous cycle, as represented by Expression (6). Specifically, the previous angular velocity output unit 16 divides a value $X(FFF)_{16}$ that represents 360° by the previous-cycle time $T(n-1)$ to obtain the angular velocity $V(n-1)$ in the previous cycle.

$$V(n-1) = 360°/T(n-1) \qquad (6)$$

The arrival time measurement unit 20 measures the arrival time $S(n, i)$ that is the time until the output rotation angle $\theta(t)$ reaches the specified rotation angle $B\theta(i)$ from the reference angle (0°), as illustrated in FIG. 4. In the expression, i=1 to 8. An arrival time $S(n, 8)$ that is a time until the output rotation angle $\theta(t)$ reaches a specified rotation angle $B\theta(8)$ is equal to a current-cycle time $T(n)$.

$$S(n,8) = T(n) \qquad (7)$$

The unit time calculation unit 18 divides the previous-cycle time $T(n-1)$ by the unit angle $(360/\theta u)$ to obtain a unit time $tu(n-1)$ that is a time required for change of the output rotation angle $\theta$ by 1 bit in the previous cycle. The unit time calculation unit 18 shifts the previous-cycle time $T(n-1)$ to right by 12 bits to obtain the unit time $tu(n-1)$.

$$tu(n-1) = T(n-1) \times (\theta u/360) \qquad (8)$$

The reference time calculation unit 22 multiplies the specified rotation angle $B\theta(i)$ and the unit time $tu(n-1)$ to obtain the reference time $SE(n, i)$ that is a time until the output rotation angle $\theta(t)$ reaches the specified rotation angle $B\theta(i)$ from the reference angle 0° when it is assumed that the AC motor 702 rotates at the same angular velocity as that in the previous cycle.

$$SE(n-1,i) = B\theta(i) \times tu(n-1) \qquad (9)$$

The time difference calculation unit 24 subtracts the reference time $SE(n, i)$ from the arrival time $S(n, i)$ to obtain the time difference $\Delta S(n, i)$.

$$\Delta S(n,i) = S(n,i) - SE(n,i) \qquad (10)$$

The error angle calculation unit 26 multiplies the time difference $\Delta S(n, i)$ and the previous angular velocity $V(n-1)$ to obtain the error angle $\Delta deg(n, i)$.

$$\Delta deg(n,i) = V(n-1) \times \Delta S(n,i) \qquad (11)$$

For example, the arrival time measurement unit 20 measures an arrival time $S(n, 4)$ that is a time until the output rotation angle θ(t) reaches a specified rotation angle Bθ(4), as illustrated in FIG. 4. The reference time calculation unit 22 calculates the reference time SE(n, 4) at which a straight line with a slope of the previous angular velocity V(n−1) crosses the specified rotation angle Bθ(4). The time difference calculation unit 24 calculates a time difference ΔS(n, 4) between S(n, 4) and SE(n, 4). The error angle calculation unit 26 multiplies the time difference ΔS(n, 4) and the previous angular velocity V(n−1) to obtain an error angle Δdeg(n, 4).

The correction unit 28 obtains a corrected rotation angle θ'(t) by using the output rotation angle θ(t) and the error angle Δdeg(n, i) (i=1 to 8). When the output rotation angle θ(t) corresponds to a specified rotation angle Bθ(j) (j is any of 1 to 8), the correction unit 28 adds the output rotation angle θ(t) and an error angle Δdeg(n, j) to obtain the corrected rotation angle θ'(t). When the rotation angle θ(t) is between the specified rotation angle Bθ(j) and a specified rotation angle Bθ(j+1), the correction unit 28 obtains an error angle Δdeg(n, θ(t)) for the rotation angle θ(t) by linear interpolation between the error angle Δdeg(n, j) and an error angle Δdeg(n, j+1). The correction unit 28 then obtains the corrected rotation angle θ'(t) by adding the rotation angle θ(t) and the error angle Δdeg(n, θ(t)).

Figure 5:
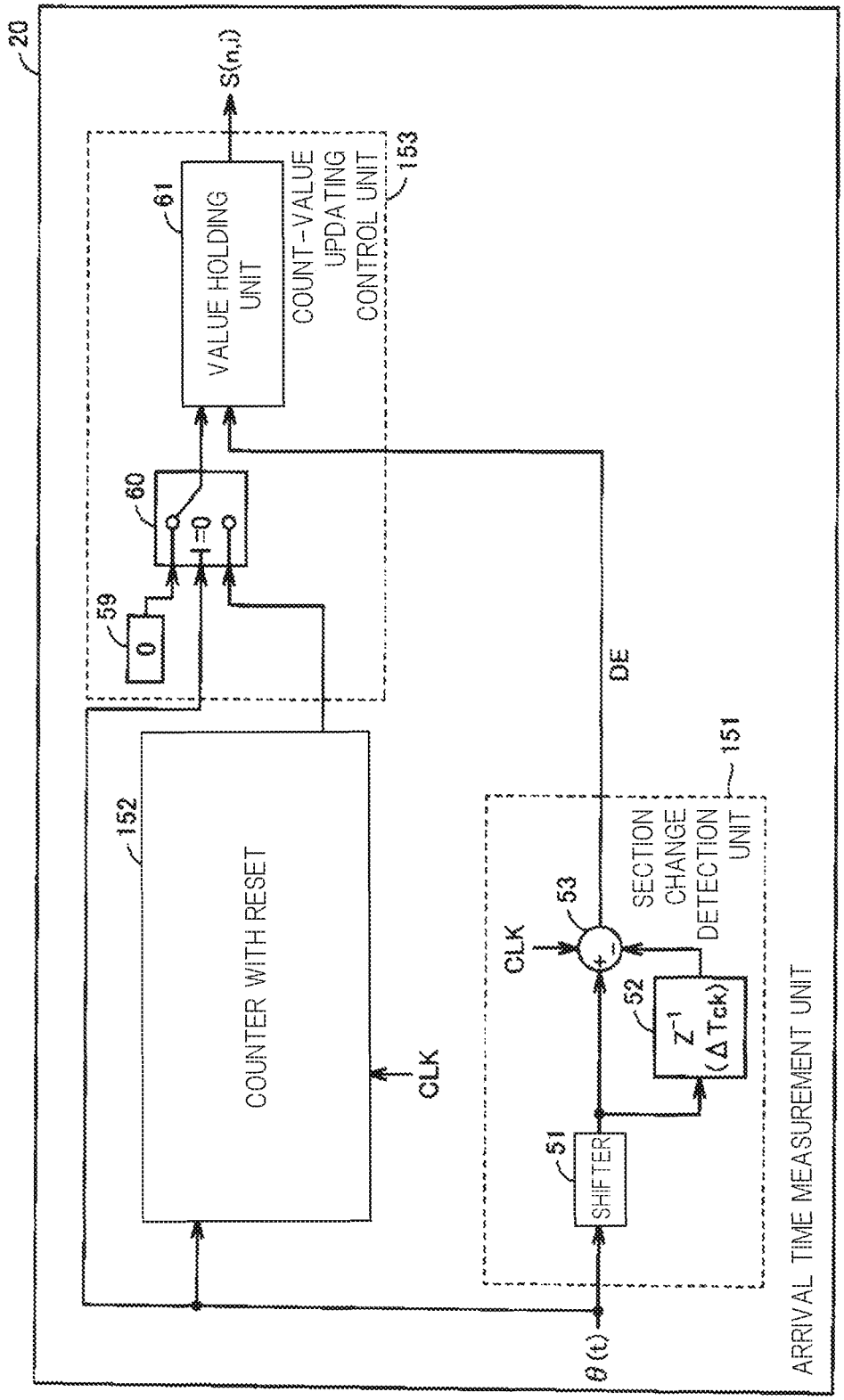
FIG. 5 illustrates a configuration of an arrival time measurement unit 20 according to the second embodiment.

FIG. 5 illustrates a configuration of the arrival time measurement unit 20 according to the second embodiment.

The arrival time measurement unit 20 includes a section change detection unit 151, a counter with reset 152, and a count-value updating control unit 153.

The section change detection unit 151 includes a shifter 51, a delay unit 52, and a subtractor 53.

The shifter 51 shifts a 12-bit output rotation angle θ(t) by (12−m) bits to right, that is, 9 bits to right.

The delay unit 52 delays an output of the shifter 51 by a time ΔTck.

The subtractor 53 subtracts an output of the delay unit 52 from the output of the shifter 51 for each period ΔTck of the clock CLK and outputs a detection signal DE.

By the above-described configuration, the output rotation angle θ(t) is shifted by (12−m) bits to right by the section change detection unit 151, and the detection signal DE becomes "1" when a lowermost bit is changed after shifting, and becomes "0" when the lowermost bit is not changed after shifting. When the detection signal DE becomes "1", this fact represents that the output rotation angle θ(t) has reached the specified rotation angle Bθ(i) (i=1 to $2^m$).

The counter with reset 152 updates a count value CT for each period ΔTck of the clock CLK. The counter with reset 152 resets the count value CT to "0" when the output rotation angle θ(t) is "0".

The count-value updating control unit 153 includes a fixed value holding register 59, a switch 60, and a value holding unit 61.

The fixed value holding register 59 holds a fixed value "0".

The switch 60 outputs "0" output from the fixed value holding register 59 when the output rotation angle θ(t) is "0". The switch 60 outputs an output of the counter with reset 152 (the count value CT) when the output rotation angle θ(t) is an angle other than "0".

The value holding unit 61 outputs and holds the output of the switch 60 (the count value CT) when the detection signal DE is "1". The value holding unit 61 outputs its held value (the output of the switch 60) when the detection signal DE is "0".

By the above configuration, the count-value updating control unit 153 acquires a current count value CT from the counter with reset 152 and outputs it as S(n, i), when the detection signal DE is "1". The count-value updating control unit 153 does not acquire the current count value from the counter with reset 152 and outputs the count value acquired last time as S(n, i), when the detection signal DE is "0".

As described above, an error angle is calculated on the basis of a time difference between an arrival time and a reference time according to the present embodiment. Therefore, it is possible to correct a rotation angle in a smaller calculation amount as compared with processing such as frequency analysis.

Third Embodiment

Figure 6:
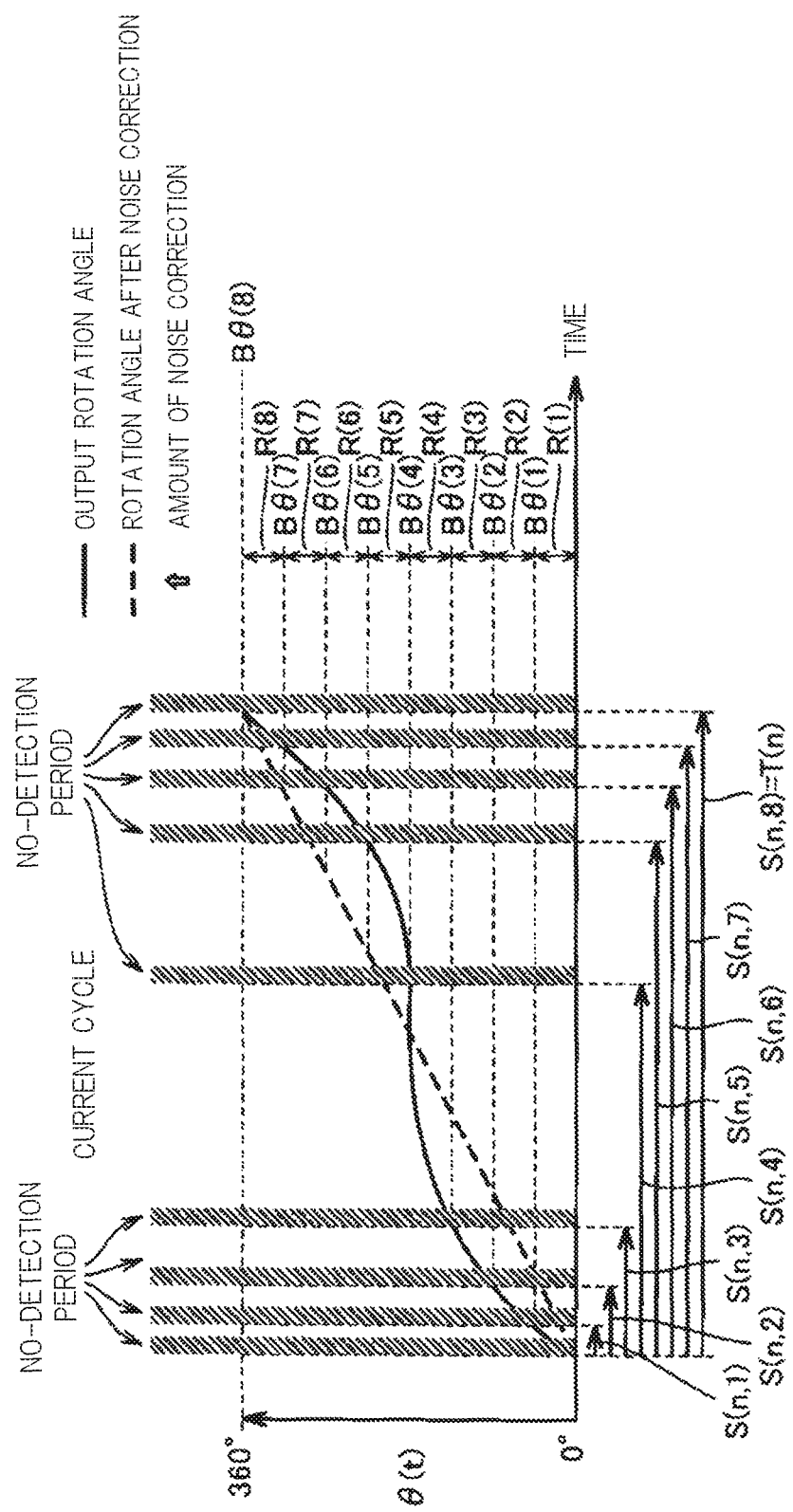
FIG. 6 explains a no-detection period set in a third embodiment.

FIG. 6 explains a no-detection period set in a third embodiment.

In the present embodiment, an arrival time measurement unit does not measure an arrival time in a no-detection period illustrated in FIG. 6 that is a period immediately after an output rotation angle θ(t) has reached a specified rotation angle Bθ(i). The length of the no-detection period is assumed to be a value obtained by dividing a previous-cycle time T(n−1) by $2^{m+1}$, for example, but can be changed in accordance with a situation. In the present embodiment, $2^{m+1}$ is 16.

Figure 7:
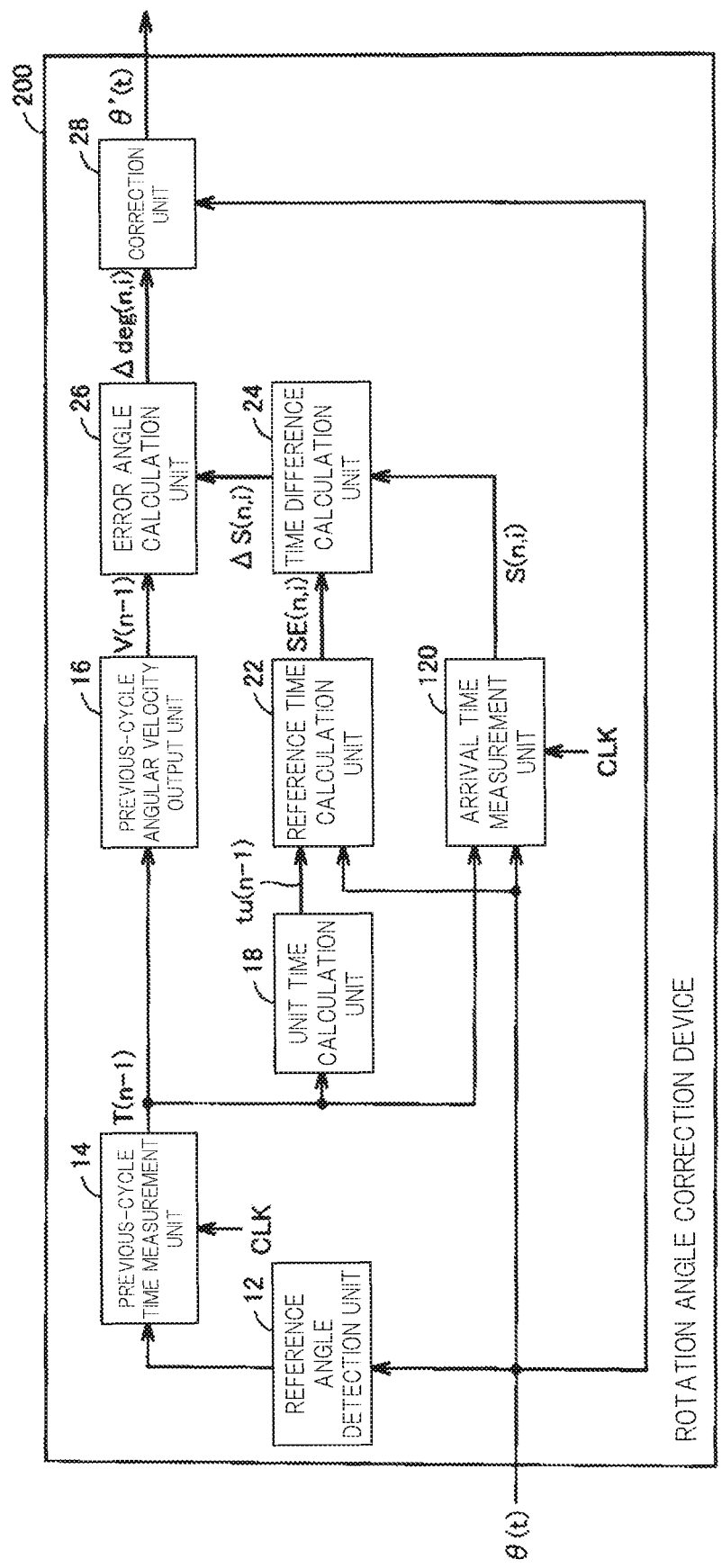
FIG. 7 illustrates a configuration of a rotation angle correction device 200 according to the third embodiment.

FIG. 7 illustrates a configuration of a rotation angle correction device 200 according to the third embodiment.

The rotation angle correction device 200 according to the third embodiment is different from the rotation angle correction device 100 according to the second embodiment in an arrival time measurement unit 120.

Figure 8:
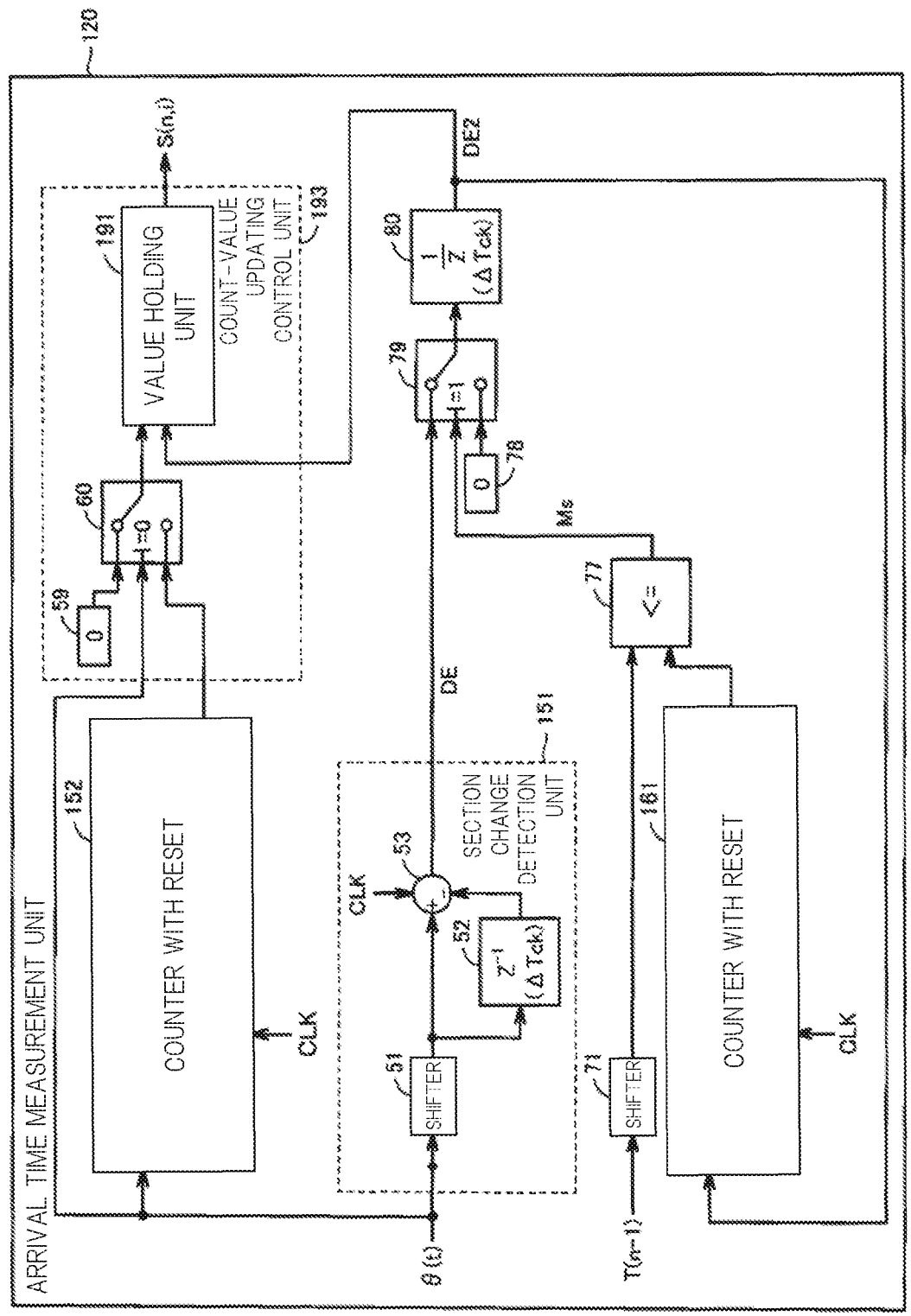
FIG. 8 illustrates a configuration of an arrival time measurement unit 120 according to the third embodiment.

FIG. 8 illustrates a configuration of the arrival time measurement unit 120 according to the third embodiment.

The arrival time measurement unit 120 includes the components of the arrival time measurement unit 20 according to the second embodiment and also includes a counter with reset 161, a shifter 71, a relation calculation unit 77, a fixed value holding register 78, a switch 79, and a delay unit 80. Further, the arrival time measurement unit 120 includes a count-value updating control unit 193, in place of the count-value updating control unit 153 according to the second embodiment.

The counter with reset 161 updates a count value CT2 for each period ΔTck of the clock CLK. The counter with reset 161 resets the count value CT2 to "0" when a detection signal DE2 is "1".

The count-value updating control unit 193 is different from the count-value updating control unit 153 according to the second embodiment in including a value holding unit 191 in place of the value holding unit 61.

The value holding unit 191 outputs and holds an output of the switch 60 (the count value CT) when the detection signal DE2 is "1". The value holding unit 191 outputs its held value (the output of the switch 60) when the detection signal DE2 is "0".

The shifter 71 shifts a previous-cycle time T(n−1) by m+1 bits, that is, 4 bits in this example, to right.

The relation calculation unit 77 compares T'(n−1) obtained by shifting the previous-cycle time T(n−1) by 4 bits to right and an output of the counter with reset 161 with each other.

When T'(n−1) obtained by shifting the previous-cycle time T(n−1) by 4 bits to right is equal to or smaller than the output of the counter with reset 161 (the count value CT2), the relation calculation unit 77 sets a mask signal Ms to "1".

When T'(n−1) obtained by shifting the previous-cycle time T(n−1) by 4 bits to right exceeds the output of the counter with reset 161 (the count value CT2), the relation calculation unit 77 sets the mask signal Ms to "0".

The fixed value holding register 78 holds a fixed value "0".

The switch 79 outputs "0" output from the fixed value holding register 78 as the detection signal DE2, when the mask signal Ms is "0". The switch 79 outputs the detection signal DE as the detection signal DE2, when the mask signal Ms is "1".

As described above, according to the present embodiment, an arrival time is not measured in a no-detection period immediately after an output rotation angle θ(t) has reached a specified rotation angle Bθ(i). Therefore, it is possible to reduce an effect of random noise occurring in an output rotation angle, for example, when the number of sections of the output rotation angle, $2^m$, is increased.

Fourth Embodiment

The second and third embodiments assume that a time of each cycle is not changed. In the present embodiment, when a time of a cycle is changed because of acceleration or deceleration of the AC motor 702, correction of an error angle based on acceleration or deceleration is performed in addition to the aforementioned correction based on noise.

Figure 9:
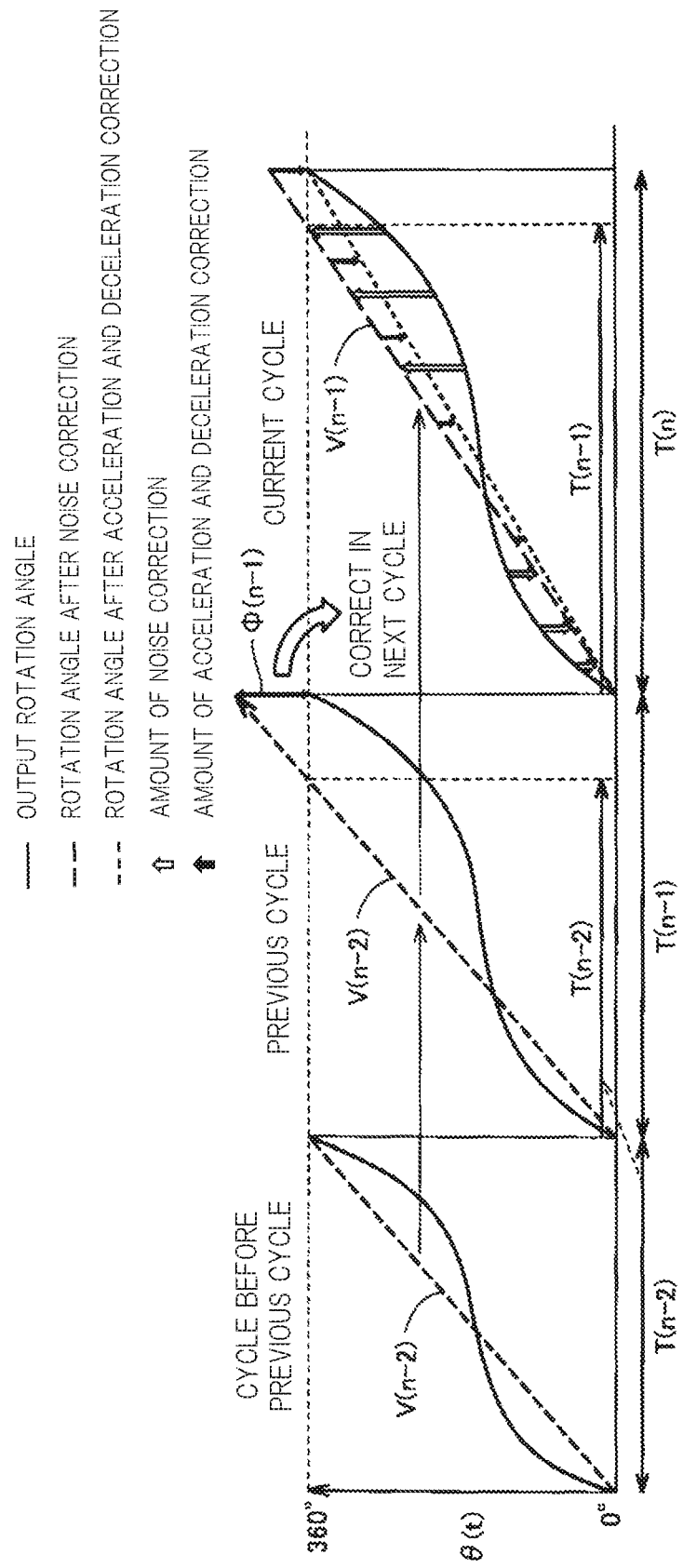
FIG. 9 explains an example in which a time of a cycle is changed by acceleration or deceleration of an AC motor 702.

FIG. 9 explains an example in which a time of a cycle is changed by acceleration or deceleration of the AC motor 702.

Since a time T(n−2) of a cycle before previous one and a previous-cycle time T(n−1) are different from each other, an output rotation angle θ(t) does not reach 360° in a time in which the output rotation angle θ(t) reaches 360° at an angular velocity V(n−2) in the cycle before the previous one, in the previous cycle. At a timing at which the rotation angle θ(t) actually reaches 360° in the previous cycle, the rotation angle θ(t) for the angular velocity V(n−2) in the cycle before the previous one reaches an angle of 360°+0ΔΦ(n−1). In the present embodiment, an angular error ΔΦ(n−1) is corrected in a current cycle.

Figure 10:
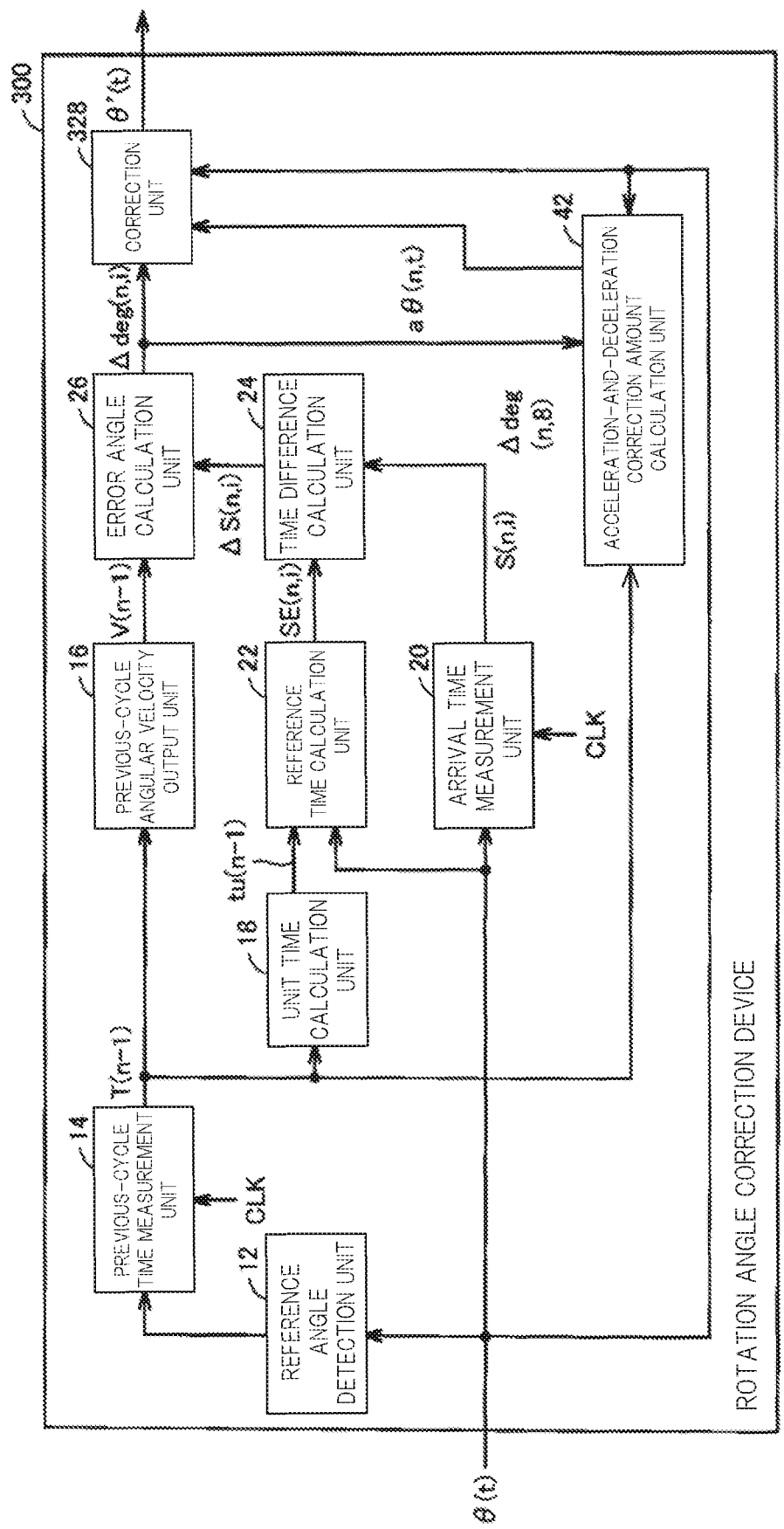
FIG. 10 illustrates a configuration of a rotation angle correction device 300 according to a fourth embodiment.

FIG. 10 illustrates a configuration of a rotation angle correction device 300 according to a fourth embodiment.

The rotation angle correction device 300 according to the fourth embodiment is different from the rotation angle correction device 100 according to the second embodiment in including an acceleration-and-deceleration correction amount calculation unit 42 and including a correction unit 328 in place of the correction unit 28.

Figure 11:
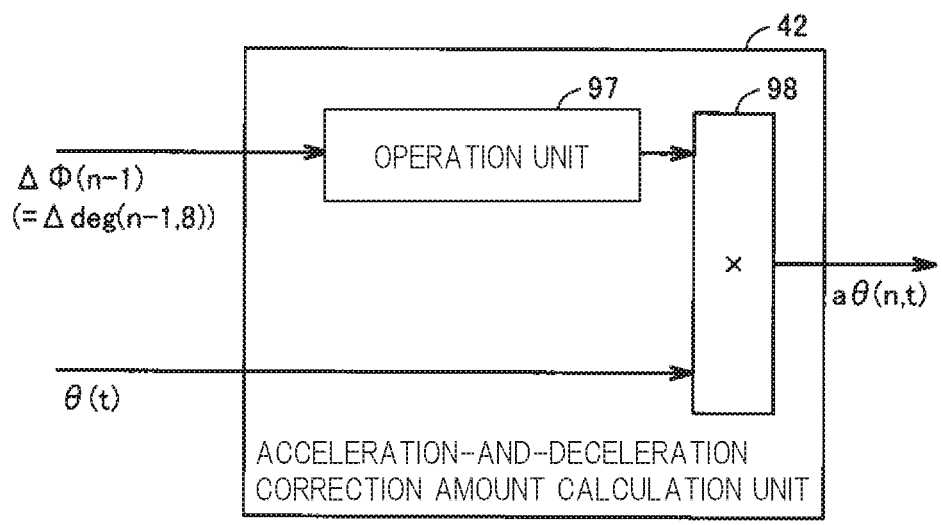
FIG. 11 illustrates a configuration of an acceleration-and-deceleration correction amount calculation unit 42 according to the fourth embodiment.

FIG. 11 illustrates a configuration of the acceleration-and-deceleration correction amount calculation unit 42 according to the fourth embodiment.

The acceleration-and-deceleration correction amount calculation unit 42 includes a calculation unit 97 and a multiplication unit 98.

The calculation unit 97 acquires an angular error ΔΦ(n−1) that is a product of a difference between a previous-cycle time T(n−1) and a time T(n−2) of a cycle before previous one, and an angular velocity V(n−1) in the cycle before previous one, from the error angle calculation unit 26 in a current cycle, as represented by the following expression.

$$\Delta\Phi(n-1)=V(n-2)\{T(n-1)-T(n-2)\} \quad (12)$$

The angular error ΔΦ(n−1) is equal to an error angle Δdeg(n−1, 8) output from the error angle calculation unit 26 in the current cycle, as represented by the following expression.

$$\Delta\Phi(n-1)=\Delta\deg(n-1,8) \quad (13)$$

The calculation unit 97 obtains an angular error dφ(n) per unit angle θu of an output rotation angle θ on the basis of the angular error ΔΦ(n−1), as represented by the following expression. The unit angle θu is an angle per 1 bit of the output rotation angle θ as represented by Expression (1).

$$d\varphi(n)=\Delta\Phi(n-1)\times(\theta u/360) \quad (14)$$

The multiplication unit 98 multiplies the output rotation angle θ(t) and the angular error dφ(n) per unit angle θu in the current cycle to obtain an acceleration-and-deceleration correction amount aθ(n, t) for the output rotation angle θ(t).

$$a\theta(n,t)=\theta(t)\times d\varphi(n) \quad (15)$$

The correction unit 328 obtains a corrected rotation angle θ1'(t) by using the output rotation angle θ(t), the error angle Δdeg(n, i) (i=1 to 8), and the acceleration-and-deceleration correction amount aθ(n, t).

When the output rotation angle θ(t) corresponds to a specified rotation angle Bθ(j) (j is any of 1 to 8), the correction unit 328 adds the output rotation angle θ(t) and an error angle Δdeg(n, j) to obtain the corrected rotation angle θ1'(t). When the rotation angle θ(t) is between the specified rotation angle Bθ(j) and a specified rotation angle Bθ(j+1), the correction unit 328 obtains an error angle Δdeg(n, θ(t)) for the rotation angle θ(t) by linear interpolation between the error angle Δdeg(n, j) and an error angle Δdeg(n, j+1). The correction unit 328 obtains the corrected rotation angle θ1'(t) by adding the rotation angle θ(t) and the error angle Δdeg(n, θ(t)). The correction unit 328 calculates a corrected rotation angle θ'(t) by subtracting the acceleration-and-deceleration correction amount aθ(n, t) from the corrected rotation angle θ1'(t).

As described above, according to the present embodiment, when a time of a cycle is changed because of acceleration or deceleration of an AC motor, an error angle based on acceleration or deceleration can be corrected.

Fifth Embodiment

Figure 12:
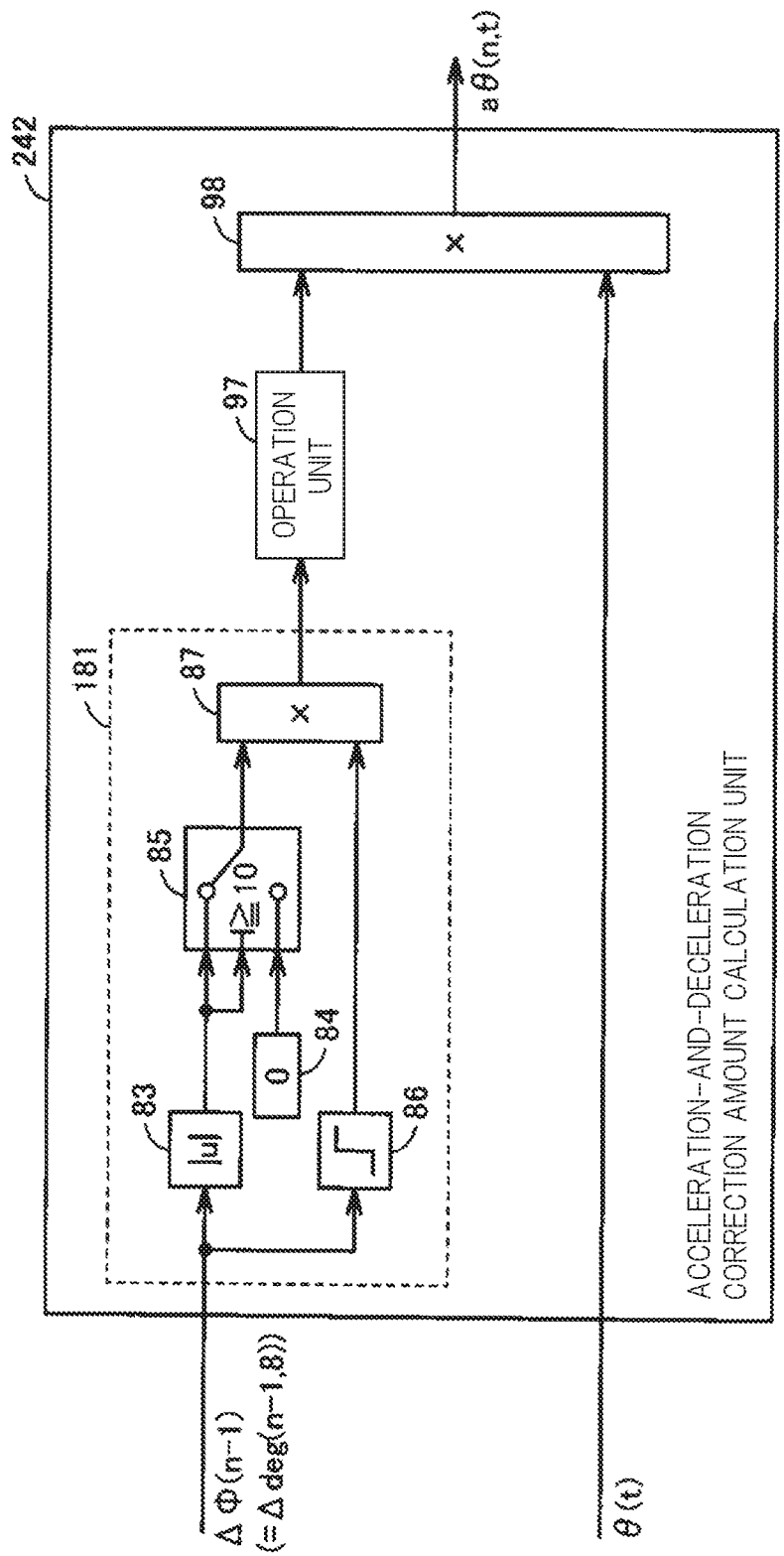
FIG. 12 illustrates a configuration of an acceleration-and-deceleration correction amount calculation unit 242 according to a fifth embodiment.

FIG. 12 illustrates a configuration of an acceleration-and-deceleration correction amount calculation unit 242 according to a fifth embodiment.

The acceleration-and-deceleration correction amount calculation unit 242 calculates an acceleration-and-deceleration correction amount aθ(n, t), assuming that an angular error Δφ(n−1) is "0", when the angular error Δφ(n−1) is smaller than a threshold value.

The acceleration-and-deceleration correction amount calculation unit 242 includes an error-angle processing unit 181, the calculation unit 97, and the multiplication unit 98. The calculation unit 97 and the multiplication unit 98 are the same as those in the fourth embodiment.

The error-angle processing unit 181 includes an absolute value output unit 83, a sign output unit 86, a fixed value holding register 84, a switch 85, and a sign addition unit 87.

The absolute value output unit 83 outputs an absolute value of the angular error Δφ(n−1) (=Δdeg(n−1, 8) input thereto.

The sign output unit 86 outputs a sign of the angular error Δθ(n−1) (=Δdeg(n−1, 8) input thereto.

The fixed value holding register 84 holds "0".

The switch 85 outputs the absolute value of the angular error Δφ(n−1) output from the absolute value output unit 83 when that absolute value is equal to or larger than a threshold value "10". The switch 85 outputs "0" held by the fixed value holding register 84 when the absolute value of the angular error Δφ(n−1) output from the absolute value output unit 83 is smaller than the threshold value "10".

The sign addition unit 87 adds a sign output from the sign output unit 86 to the output of the switch 85.

By the error angle processing unit 181 having the above configuration, "0" is supplied to the calculation unit 97, in place of the angular error Δφ(n−1), when the magnitude of the angular error Δφ(n−1) is smaller than the threshold value "10".

As described above, according to the present embodiment, an acceleration-and-deceleration correction amount is calculated assuming an angular error to be "0", when the angular error is smaller than a threshold value. Therefore, it is possible to prevent correction based on acceleration or deceleration from being performed, when acceleration or deceleration of an AC motor is not performed and therefore only noise is overlapped on the angular error.

Sixth Embodiment

Figure 13:
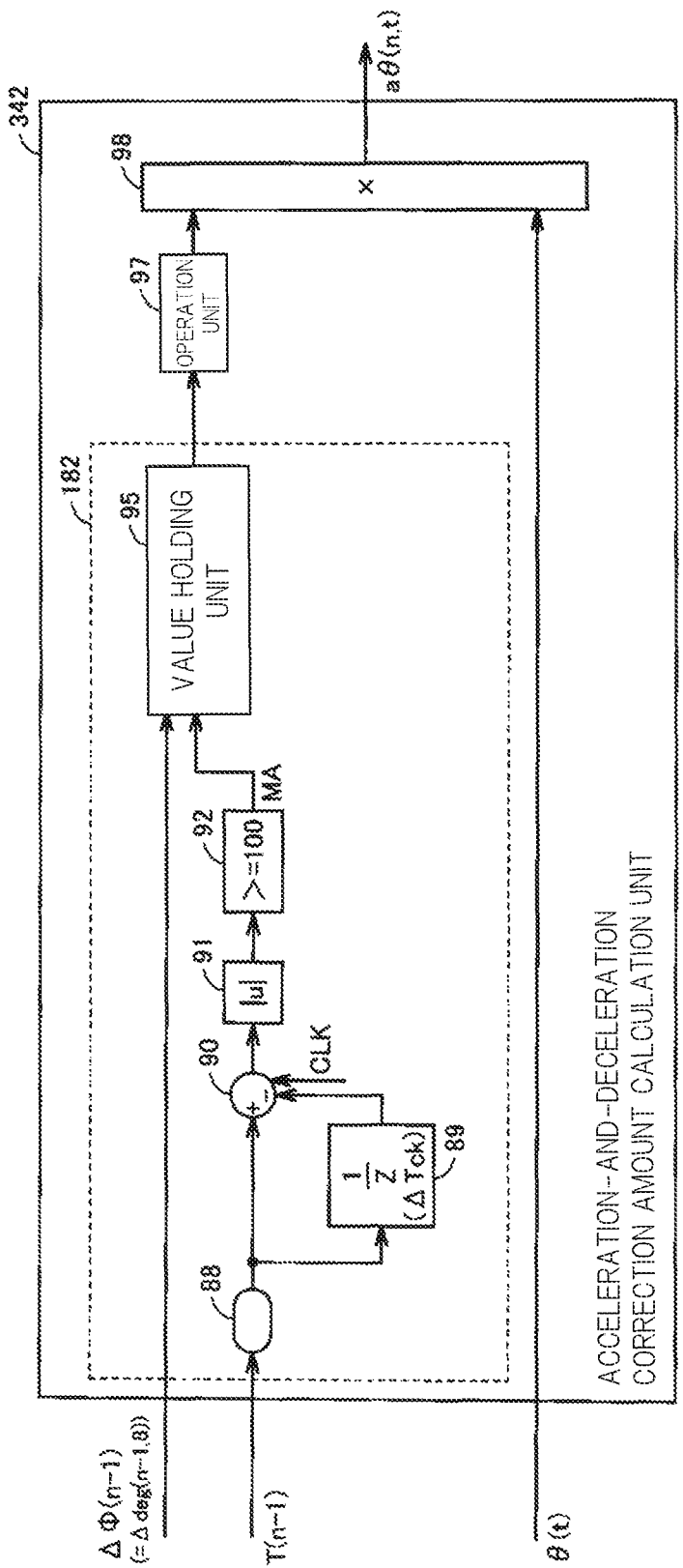
FIG. 13 illustrates a configuration of an acceleration-and-deceleration correction amount calculation unit 342 according to a sixth embodiment.

FIG. 13 illustrates a configuration of an acceleration-and-deceleration correction amount calculation unit 342 according to a sixth embodiment.

When a difference between a previous-cycle time T(n−1) and a time T(n−2) of a cycle before previous one is smaller than a threshold value, the acceleration-and-deceleration correction amount calculation unit 342 calculates an acceleration-and-deceleration correction amount aθ(n, t) in a current cycle by using an angular error used for calculating an acceleration-and-deceleration correction amount aθ(n−1, t) in a previous cycle.

The acceleration-and-deceleration correction amount calculation unit 342 includes a cycle-time change determination unit 182, the calculation unit 97, and the multiplication unit 98. The calculation unit 97 and the multiplication unit 98 are the same as those in the fourth embodiment.

The cycle-time change determination unit 182 includes a latch 88, a delay unit 89, a subtractor 90, an absolute value output unit 91, a comparator 92, and a value holding unit 95.

The latch 88 holds the previous-cycle time T(n−1) until it receives the next new input.

The delay unit 89 delays an output of the latch 88 by a time ΔTck.

The subtractor 90 subtracts an output of the delay unit 89 from the output of the latch 88.

The absolute value output unit 91 outputs an absolute value of an output of the subtractor 90.

The comparator 92 sets a mask signal MA to "0" when an output of the absolute value output unit 91 is equal to or larger than a threshold value "100" in a case where the threshold value is set to "100", for example, and sets the mask signal MA to "1" when the output of the absolute value output unit 91 is smaller than the threshold value "100".

The value holding unit 95 outputs an angular error ΔΦ(n−1) and holds a value of the angular error ΔΦ(n−1) when the mask signal MA is "0" (indicating rapid acceleration or deceleration). The value holding unit 95 outputs its held value (the value of the angular error Δφ(n−1)) when the mask signal MA is "1" (indicating that acceleration or deceleration is not rapid).

By the cycle-time change determination unit 182 having the above configuration, the angular error Δφ(n−1) is sent to the calculation unit 97, when the magnitude of the difference between T(n−1) and T(n−2) is equal to or larger than the threshold value "100". An error angle (ΔΦ(k), k n−2) that has been output to the calculation unit 97 in the previous cycle is sent to the calculation unit 97, when the magnitude of the difference between T(n−1) and T(n−2) is smaller than the threshold value "100".

As described above, according to the present embodiment, when a difference between a previous-cycle time and a time of a cycle before previous one is smaller than a threshold value, an error angle that has been output to a calculation unit in a previous cycle is supplied to the calculation unit, and the calculation unit calculates an acceleration-and-deceleration correction amount by using this error angle. Therefore, when acceleration or deceleration of an AC motor is not performed and only noise is overlapped on an angular error, it is possible to prevent correction from being performed on the basis of such noise.

Seventh Embodiment

Figure 14:
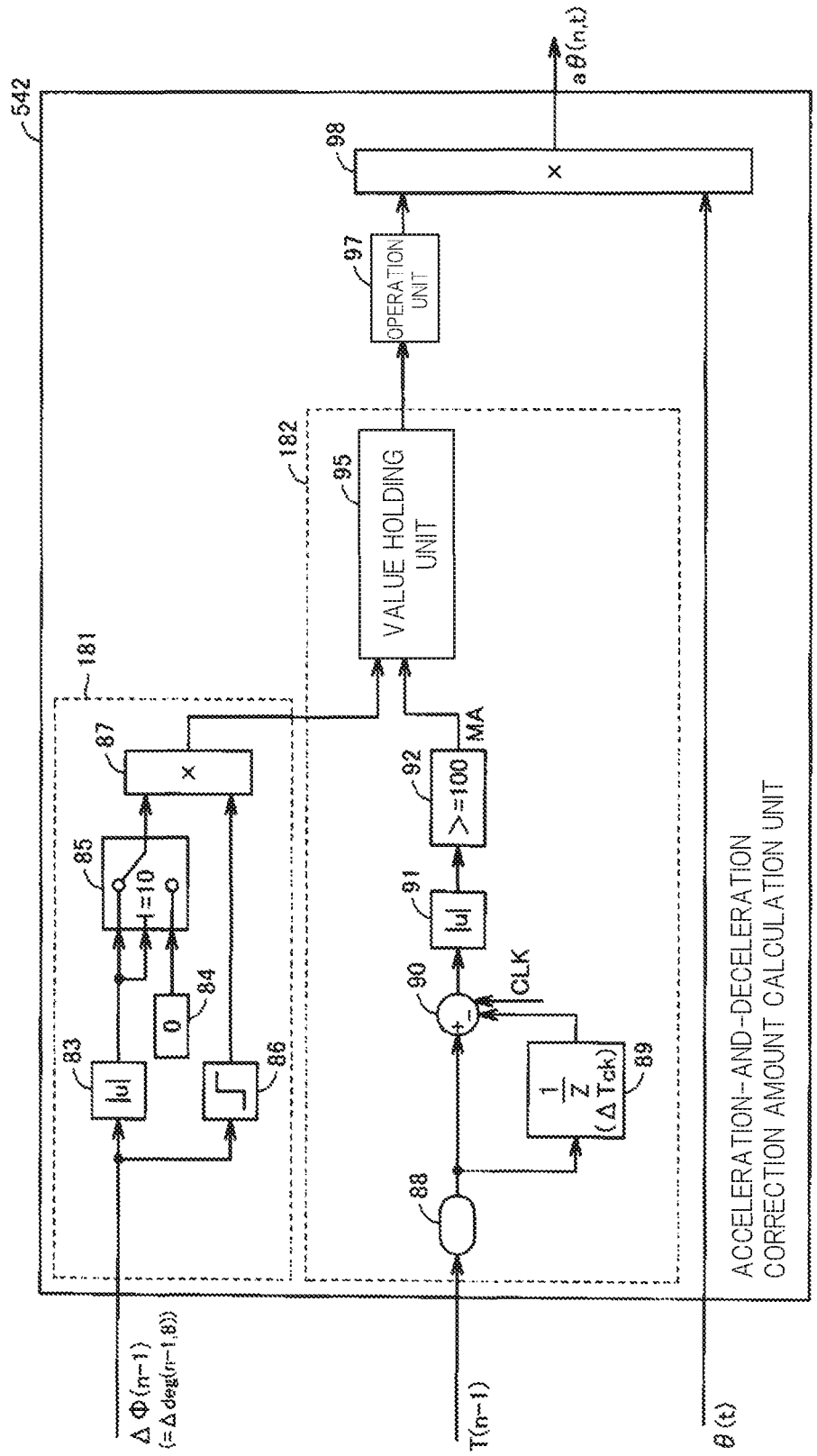
FIG. 14 illustrates a configuration of an acceleration-and-deceleration correction amount calculation unit 542 according to a seventh embodiment.

FIG. 14 illustrates a configuration of an acceleration-and-deceleration correction amount calculation unit 542 according to a seventh embodiment.

The acceleration-and-deceleration correction amount calculation unit 542 includes the error angle processing unit 181, the cycle-time change determination unit 182, the calculation unit 97, and the multiplication unit 98.

The calculation unit 97 and the multiplication unit 98 are the same as those in the fourth to sixth embodiments. The error angle processing unit 181 is the same as that in the fifth embodiment. The cycle-time change determination unit 182 is the same as that in the sixth embodiment.

The acceleration-and-deceleration correction amount calculation unit 542 obtains an angular error dφ(n) per unit angle θu of an output rotation angle θ on the basis of an angular error ΔΦ(n−1), when the angular error ΔΦ(n−1) is equal to or larger than a threshold value and a difference between a previous-cycle time T(n−1) and a time T(n−2) of a cycle before previous one is equal to or larger than a threshold value. The acceleration-and-deceleration correction amount calculation unit 542 multiplies the output rotation angle θ(t) and the angular error dφ(n) per unit angle θu in a current cycle to obtain an acceleration-and-deceleration correction amount aθ(n, t) for the output rotation angle θ(t).

The acceleration-and-deceleration correction amount calculation unit 542 calculates an acceleration-and-deceleration correction amount aθ(n, t) assuming that the angular error Φ(n−1) is "0", when the angular error ΔΦ(n−1) is smaller than the threshold value. The acceleration-and-deceleration correction amount calculation unit 542 calculates the acceleration-and-deceleration correction amount aθ(n, t) in the current cycle by using an angular error used for calculating an acceleration-and-deceleration correction amount aθ(n−1, t) in a previous cycle, when the difference between the previous-cycle time T(n−1) and the time T(n−2) of the cycle before previous one is smaller than the threshold value.

As described above, according to the present embodiment, the same advantageous effects as those of the fourth to sixth embodiments are obtained.

Eighth Embodiment

Figure 15:
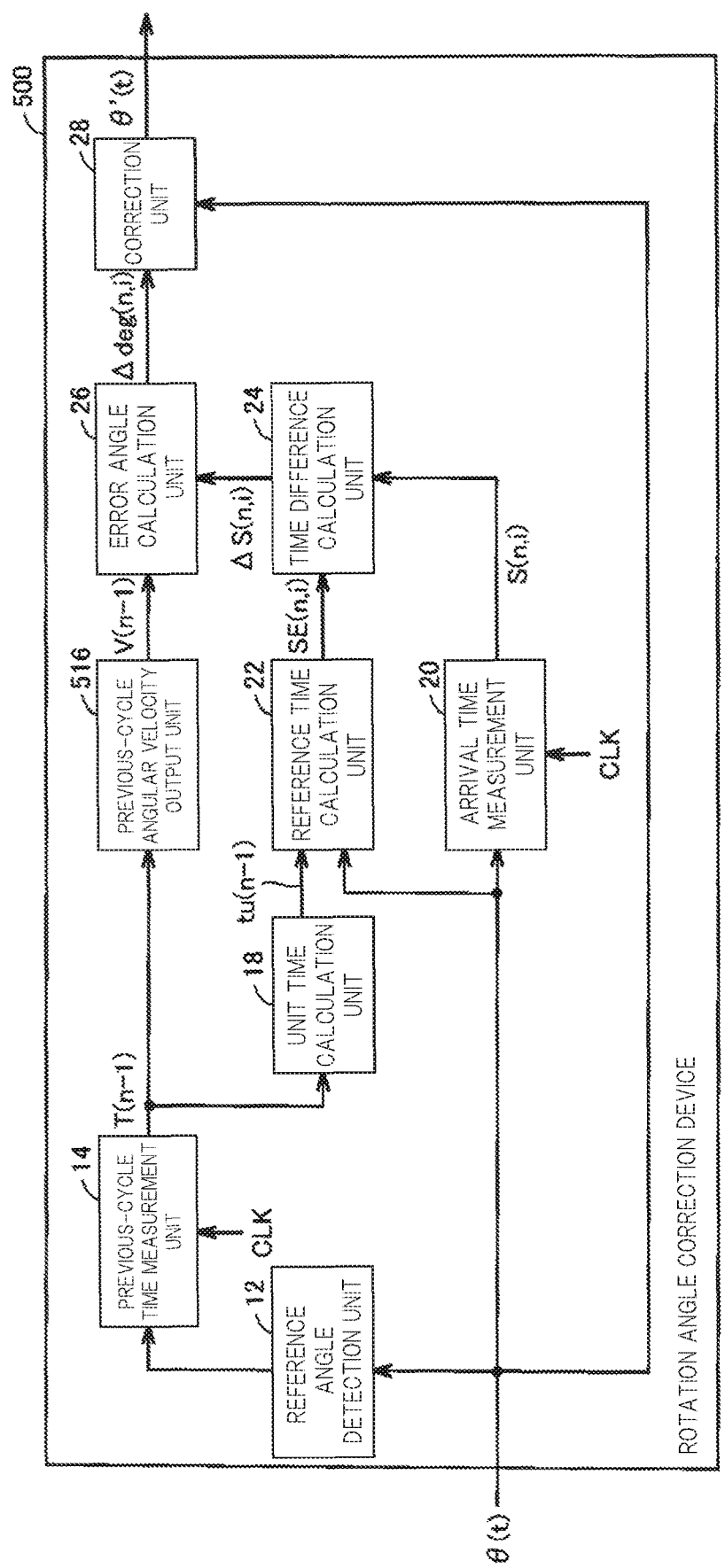
FIG. 15 illustrates a configuration of a rotation angle correction device 500 according to an eighth embodiment.

FIG. 15 illustrates a configuration of a rotation angle correction device 500 according to an eighth embodiment.

The rotation angle correction device 500 according to the eighth embodiment is different from the rotation angle correction device 100 according to the second embodiment in a previous angular velocity output unit 516.

In the second embodiment, the previous angular velocity output unit 16 divides 360° by a previous-cycle time T(n−1) to obtain an angular velocity V(n−1) in a previous cycle, as represented by Expression (6).

$$V(n-1) = 360°/T(n-1) \tag{6}$$

In the present embodiment, the previous angular velocity output unit 516 obtains the angular velocity V(n−1) in the previous cycle corresponding to the previous-cycle time T(n−1) sent from a previous-cycle measurement unit, by using a time-angular velocity map that defines a relation of Expression (6) between the previous-cycle time T(n−1) and the angular velocity V(n−1) in the previous cycle.

Figure 16:
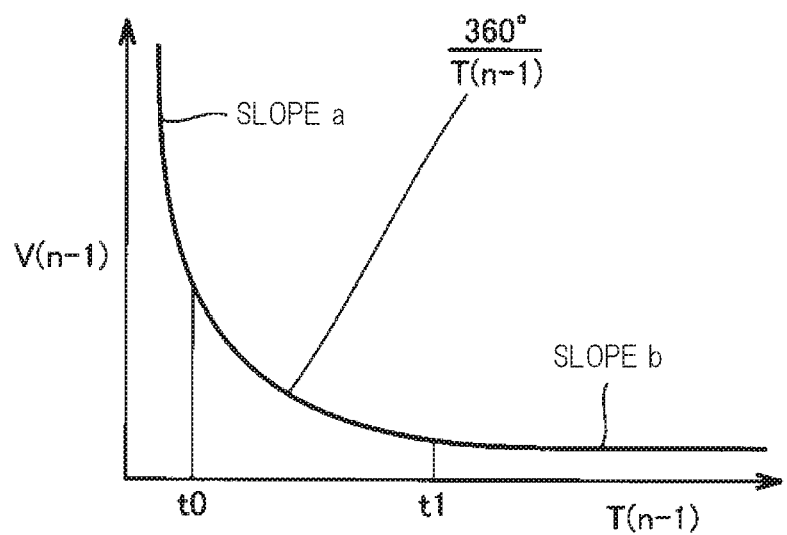
FIG. 16 illustrates an example of a time-angular velocity map.

FIG. 16 illustrates a relation between a time and an angular velocity.

A time is inversely proportional to an angular velocity. The inversely proportional characteristics are converged to 0. Therefore, a largely changing portion is important. In FIG. 16, a range from t0 to t1 is a period in which large change occurs.

The time-angular velocity map defines a relation between a previous-cycle time T(n−1) and an angular velocity V(n−1) in the previous cycle, represented by Expression (6), for the time T(n−1) in the range from t0 to t1.

In a range in which the time T(n−1) of the previous cycle is smaller than t0, the relation between V(n−1) and T(n−1) can be approximated by the following linear equation.

$$V(n-1) = a \times T(n-1) \quad (16)$$

In a range in which the previous-cycle time T(n−1) is larger than t1, the relation between V(n−1) and T(n−1) can be approximated by the following linear equation.

$$V(n-1) = b \times T(n-1) \quad (17)$$

The previous angular velocity output unit 516 obtains the angular velocity V(n−1) in the previous cycle corresponding to the previous-cycle time T(n−1) by using the time-angular velocity map when the previous-cycle time T(n−1) is in the range from t0 to t1. The previous angular velocity output unit 516 obtains the angular velocity V(n−1) in the previous cycle corresponding to the previous-cycle time T(n−1) by using Expression (16), when the previous-cycle time T(n−1) is smaller than t0. The previous angular velocity output unit 516 obtains the angular velocity V(n−1) in the previous cycle corresponding to the previous-cycle time T(n−1) by using Expression (17), when the previous-cycle time T(n−1) is larger than t1.

As described above, according to the present embodiment, it is possible to obtain an angular velocity V(n−1) in a previous cycle without performing division represented by Expression (6). Therefore, the number of dividing circuits can be reduced, so that the circuit scale can be made small.

In the above, the invention made by the inventors of the present application has been specifically described by way of the embodiments. However, it is naturally understood that the present invention is not limited to the aforementioned embodiments, and can be changed in various ways within the scope not departing from the gist thereof.

What is claimed is:

1. A rotation angle correction device for correcting an output rotation angle of a resolver digital converter that converts a signal output from a resolver attached to a motor, comprising:

an arrival time measurement unit that measures an arrival time that is a time until the output rotation angle reaches a specified rotation angle from a reference angle in a current cycle;

a reference time calculation unit that calculates a reference time that is a time until the output rotation angle reaches the specified rotation angle from the reference angle assuming that the motor rotates in the current cycle at the same angular velocity as an angular velocity in a previous cycle;

a time difference calculation unit that calculates a time difference between the arrival time and the reference time;

an error angle calculation unit that multiplies the time difference and the angular velocity in the previous cycle to obtain an error angle; and a correction unit that corrects the output rotation angle based on the error angle.

2. The rotation angle correction device according to claim 1, wherein the correction unit adds the output rotation angle and the error angle to obtain a corrected rotation angle of the output rotation angle, when the output rotation angle is the specified rotation angle.

3. The rotation angle correction device according to claim 2, wherein the specified rotation angle is i (i=1 to $2^m$) times an angle obtained by dividing 360° by $2^m$.

4. The rotation angle correction device according to claim 3, wherein, when the output rotation angle is not coincident with a plurality of the specified rotation angles, the correction unit obtains the corrected rotation angle for the output rotation angle by obtaining an error angle for the output rotation angle by linear interpolation between error angles for two of the specified rotation angles and then adding the output rotation angle and the error angle for the output rotation angle.

5. The rotation angle correction device according to claim 1, further comprising a previous-cycle time measurement unit that measures a time of the previous cycle on the basis of a difference between a first timing at which the output rotation angle has reached the reference angle in the previous cycle and a second timing at which the output rotation angle has reached the reference angle.

6. The rotation angle correction device according to claim 5, further comprising a previous angular velocity output unit that obtains the angular velocity in the previous cycle on the basis of the measured time of the previous cycle.

7. The rotation angle correction device according to claim 6, wherein the previous angular velocity output unit obtains the angular velocity in the previous cycle corresponding to the measured time of the previous cycle by using a map defining a relation between the time of the previous cycle and the angular velocity in the previous cycle.

8. The rotation angle correction device according to claim 1, wherein the output rotation angle is represented by n bits, and wherein, when the specified rotation angle is i (i=1 to $2^m$) times the angle obtained by 360° by $2^m$, the arrival time measurement unit shifts the output rotation angle by (n−m) bits to right, and determines that the output rotation angle has reached the specified rotation angle when a lowermost bit after shifting is changed.

9. The rotation angle correction device according to claim 8, wherein the arrival time measurement unit does not measure the arrival time in a no-detection period immediately after the output rotation angle has reached the specified rotation angle.

10. The rotation angle correction device according to claim 9, wherein a length of the no-detection period is less than a time of the previous cycle.

11. The rotation angle correction device according to claim 1, further comprising an acceleration-and-deceleration correction amount calculation unit that acquires in a current cycle an angular error that is a product of a difference between a time of the previous cycle and a time of a cycle before previous one and an angular velocity of the cycle before previous one, obtains an angular error per unit angle of the output rotation angle on the basis of the angular error, and calculates an acceleration-and-deceleration correction amount for the output rotation angle on the basis of the output rotation angle and the angular error per unit angle,
  wherein the correction unit corrects the output rotation angle on the basis of the error angle and the acceleration-and-deceleration correction amount.

12. The rotation angle correction device according to claim 11, wherein the acceleration-and-deceleration correction amount calculation unit calculates the acceleration-and-deceleration correction amount assuming that the angular error is 0, when the angular error is smaller than a threshold value.

13. The rotation angle correction device according to claim 11, wherein the acceleration-and-deceleration correction amount calculation unit calculates the acceleration-and-deceleration correction amount in the current cycle by using an angular error used for calculating the acceleration-and-deceleration correction amount in the previous cycle, when the difference between the time of the previous cycle and the time of the cycle before previous one is smaller than a threshold value.

14. The rotation angle correction device according to claim 1,
  wherein the output rotation angle is represented by n bits,
  wherein a unit time calculation unit is provided, which shifts a time of the previous cycle by n bits to right to obtain a unit time required for change of the output rotation angle by one bit in the previous cycle, and
  wherein the reference time calculation unit multiplies the specified rotation angle and the unit time to obtain the reference time that is the time until the output rotation angle reaches the specified rotation angle from the reference angle when it is assumed that the motor rotates at the same angular velocity as the angular velocity in the previous cycle.

15. A motor control system comprising:
  a motor;
  a resolver attached to the motor;
  a resolver digital converter that converts a signal output from the resolver; and
  a rotation angle correction device that corrects an output rotation angle of the resolver digital converter, wherein
  the rotation angle correction device obtains an error angle by multiplying a difference between an arrival time that is a time until the output rotation angle reaches a specified rotation angle from a reference angle in a current cycle and a reference time that is a time until the output rotation angle reaches the specified rotation angle from the reference angle assuming that the motor rotates in the current cycle at the same angular velocity as an angular velocity in a previous cycle, and the angular velocity in the previous cycle, and corrects the output rotation angle based on the error angle.

16. A motor control system, comprising:
  a resolver digital converter (RDC) that converts an output from a resolver; and
  a rotation angle correction device that corrects an output from the RDC based on an angular velocity and a time difference,
  wherein the rotation angle correction device calculates:
    the angular velocity based on the output from the RDC,
    first and second arrival times when the output from the RDC indicates a predetermined angle, and
    the time difference between the first arrival time and the second arrival time.

17. The motor control system according to claim 16, wherein the first arrival time is calculated at a first period and the second arrival time is calculated at a second period.

18. The motor control system according to claim 16, wherein the output from the RDC is corrected based on a value multiplied by the angular velocity and the time difference.

* * * * *